(12) United States Patent
Chen

(10) Patent No.: US 9,686,527 B2
(45) Date of Patent: Jun. 20, 2017

(54) NON-FEATURE EXTRACTION-BASED DENSE SFM THREE-DIMENSIONAL RECONSTRUCTION METHOD

(71) Applicant: SUN YAT-SEN UNIVERSITY, Guangdong (CN)

(72) Inventor: Pei Chen, Guangdong (CN)

(73) Assignee: Sun Yat-Sen University, Guangzhou, Guangdong (CN)

( * ) Notice: Subject to any disclaimer, the term of this patent is extended or adjusted under 35 U.S.C. 154(b) by 0 days.

(21) Appl. No.: 15/038,325

(22) PCT Filed: Mar. 11, 2015

(86) PCT No.: PCT/CN2015/073999
§ 371 (c)(1),
(2) Date: May 20, 2016

(87) PCT Pub. No.: WO2015/154601
PCT Pub. Date: Oct. 15, 2015

(65) Prior Publication Data
US 2017/0019653 A1    Jan. 19, 2017

(30) Foreign Application Priority Data

Apr. 8, 2014    (CN) .......................... 2014 1 0139234

(51) Int. Cl.
*H04N 13/00* (2006.01)
*G06T 7/00* (2017.01)
(Continued)

(52) U.S. Cl.
CPC ........... *H04N 13/0007* (2013.01); *G06T 7/00* (2013.01); *G06T 7/593* (2017.01); *G06T 17/00* (2013.01); *H04N 2013/0074* (2013.01)

(58) Field of Classification Search
CPC ....... G06T 7/00; G06T 7/593; H04N 13/0007; H04N 2013/0074
See application file for complete search history.

(56) References Cited

U.S. PATENT DOCUMENTS

2003/0091227 A1*  5/2003  Chang ................... G06T 17/10
                                                                  382/154
2004/0096097 A1*  5/2004  Nister .................... G06T 7/55
                                                                  382/154
(Continued)

FOREIGN PATENT DOCUMENTS

| CN | 101038678 A | 9/2007 |
|---|---|---|
| CN | 103247075 A | 8/2013 |
| CN | 103914874 A | 7/2014 |

*Primary Examiner* — Edward Park
(74) *Attorney, Agent, or Firm* — Muncy, Geissler, Olds & Lowe, P.C.

(57) ABSTRACT

The present invention discloses a non-feature extraction dense SFM three-dimensional reconstruction method, comprising: inputting n images about a certain scenario, n≥2; establishing a world coordinate system consistent with a certain camera coordinate system; constructing an objective function similar to optical flow estimation by taking a depth of a three-dimensional scenario and a camera projection matrix as variables; employing a from coarse to fine pyramid method; designing an iterative algorithm to optimize the objective function; outputting depth representing the three-dimensional information of the scenario and a camera projection matrix representing relative location and pose information of the camera; and realizing dense projective, similarity or Euclidean reconstruction according to the depth representing the three-dimensional information of the scenario. The present invention can accomplish dense SFM three-dimensional reconstruction with one step. Since estimation of dense three-dimensional information is achieved by one-step optimization, an optimal solution or at least (Continued)

local optimal solution can be obtained by using the objective function as an index, it is significantly improved over an existing method and has been preliminarily verified by experiments.

8 Claims, 1 Drawing Sheet

(51) Int. Cl.
    *G06T 17/00*     (2006.01)
    *G06T 7/593*     (2017.01)

(56) References Cited

U.S. PATENT DOCUMENTS

2013/0044186 A1     2/2013   Jin et al.
2013/0266180 A1   10/2013   Jin

* cited by examiner

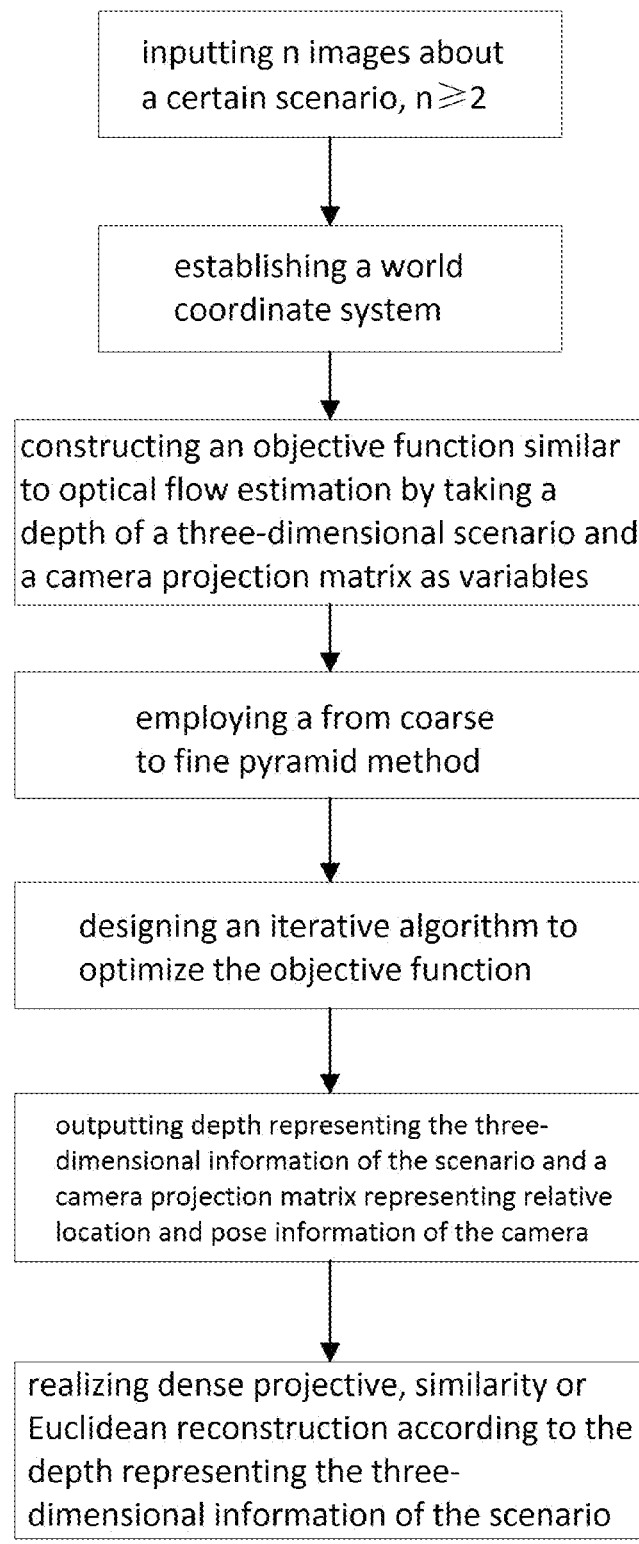

NON-FEATURE EXTRACTION-BASED DENSE SFM THREE-DIMENSIONAL RECONSTRUCTION METHOD

TECHNICAL FIELD

The present invention relates to the field of image three-dimensional reconstruction, and more particularly to a non-feature extraction dense SFM three-dimensional reconstruction method.

BACKGROUND

Computer vision-based three-dimensional reconstruction refers to capturing images by means of a digital camera or a video camera and constructing an algorithm to estimate three-dimensional information of the captured scenario or object, so as to achieve an aim of expressing a three-dimensional objective world, whose application range includes robot navigation, motor vehicle piloted driving or aided driving, virtual reality, digital media creation, computer animation, image-based rendering, cultural heritage conservation and the like.

Currently, Structure from Motion (SFM) is a commonly used three-dimensional reconstruction method, which estimates three-dimensional information of a scenario or object based on two or more images or videos. An existing technical means for realizing SFM three-dimensional reconstruction has the following characteristics: feature point-based, sparse and two-step. Existing SFM three-dimensional reconstruction is accomplished in two steps: firstly, detecting, from an image, and matching feature points with invariances of a scale or an affinity and the like, which include a Harris feature point, a Kanade-Lukas-Tomasi (KLT) feature point and a Lowe scale invariant feature transform (SIFT) point, and then, estimating three-dimensional information of the detected amount of features and a pose (including a location and an angle) of a camera.

An existing SFM three-dimensional reconstruction algorithm is accomplished in two steps, such that an optimized effect cannot be really achieved. Because two-dimensional coordinates of the feature points detected from the image have errors, on this basis, an overall optimized result cannot be obtained even if its three-dimensional information is reconstructed by an optimization algorithm. A matching accuracy of the feature points is generally lower, thereby causing three-dimensional reconstruction with a low accuracy inevitably.

An effect of the three-dimensional reconstruction is sparse; and because its three-dimensional information is estimated only for the extracted feature points, dense three-dimensional reconstruction cannot be realized, that is, the three-dimensional information of all pixel points cannot be estimated. As for a 480*640 image of 0.3 mega-pixels, on a premise of ensuring a certain correct matching ratio, only 200~300 or even less feature points can be generally detected, the feature points are very sparse with respect to the image of 0.3 mega-pixels, and no three-dimensional information of most of pixels has been directly estimated. Further, although three-dimensional information of other points may be further estimated by using a technical means such as an estimated epipolar constraint based on the feature points, to realize dense or quasi dense reconstruction, the effect of three-dimensional estimation of other subsequent points are influenced because the three-dimensional information of the estimated feature points and the pose of the camera have a certain errors.

SUMMARY OF THE INVENTION

To overcome shortcomings of the prior art, the present invention provides a non-feature extraction dense SFM three-dimensional reconstruction method. By means of this SFM three-dimensional reconstruction method, dense three-dimensional reconstruction may be realized by employing one-step optimization, without detecting and matching of feature points.

To achieve the above objective, the technical solution in the present invention is as follows:

a non-feature extraction dense SFM three-dimensional reconstruction method, including the following steps:

S1. inputting n images about a certain scenario, $n \geq 2$;

S2. establishing a world coordinate system consistent with a certain camera coordinate system, it is supposed that the world coordinate system is consistent with a coordinate system of a first camera, that is, an origin, an x axis and a y axis of the world coordinate system being coincident with a camera center of the first camera, an x axis and a y axis of an imaging plane of the first camera, and its z axis being directed perpendicularly to the imaging plane of the first camera;

S3. taking a depth of a three-dimensional scenario and a camera projection matrix as variables, the depth of the three-dimensional scenario referring to a depth q of a three-dimensional space point to which a pixel point of the first image corresponds; and the camera projection matrix referring to a 3×4 matrix $P_i$ of the other (n−1) images, $2 \leq i \leq n$;

S4. constructing an objective function similar to optical flow estimation, the objective function being a variational objective function on a continuous domain or an objective function in a discrete form thereof;

S5. designing an iterative algorithm on a continuous domain or discrete domain by employing a from coarse to fine pyramid method to optimize the objective function, so as to output a depth representing three-dimensional information of the scenario and a camera projection matrix representing relative location and pose information of the camera; and S6. realizing dense projective, similarity or Euclidean reconstruction according to the depth representing the three-dimensional information of the scenario.

This method can accomplish SFM three-dimensional reconstruction in one step, and because the estimation of the three-dimensional information is realized by one-step optimization, and an optimal solution or at least a locally optimal solution can be obtained by taking a value of the objective function as an index, it is significantly improved over the existing method and has been preliminarily verified by experiments.

The above camera refers to a camera to which a certain image corresponds. In the present invention, a camera to which a first image corresponds regarding to the scenario is the first camera, and the coordinate system of the first camera is consistent with the world coordinate system; each image corresponds to a 3×4 camera projection matrix.

The world coordinate system is established by this manner in the present invention for easy computation, in practice, the world coordinate system may be established randomly, if the world coordinate system is established randomly, parameters to be estimated include n camera projection matrices, and there is a need for three coordinate parameters to describe each three-dimensional point. Although technical details of this solution are not provided in the present invention, the solution for establishing the world coordinate system randomly is identical to the above solution for establishing the world coordinate system in a basic principle.

To realize projective three-dimensional reconstruction, parameterization setting is performed firstly, that is, during realizing the projective three-dimensional reconstruction, parameterization is particularly as follows: the camera projection matrix of the first camera is $[I_3\ 0] \in R^{3,4}$ while the world coordinate system is established, wherein $I_3$ represents a 3×3 unit matrix, 0 represents a 3×1 zero vector; projection matrices $P_i \in R^{3,4}$ of the other cameras are to-be-estimated unknown parameters, $2 \le i \le n$; the three-dimensional structure of the scenario is determined by the depth of the three-dimensional scenario defined in the first image: it is supposed that the depth of the three-dimensional scenario of the three-dimensional space point to which the pixel (x,y) of the first image corresponds is $q_{x,y}$, the three-dimensional coordinate of this three-dimensional point is $$(q_{x,y} \times x, q_{x,y} \times y, q_{x,y}) \quad (1)$$

in the projective three-dimensional reconstruction, the camera projection matrix $P_i$ and the depth $q_{x,y}$ of the three-dimensional scenario are to-be-estimated unknown parameters, and subscripts x, y are omitted for simplifying an expression without confusion.

A process of realizing the projective three-dimensional reconstruction on the continuous domain is particularly as follows:

the constructed objective function on the continuous domain is particularly as follows:

$$f(P_2, \ldots, P_n, q) = f_{data} + f_{smooth\_uv} + f_{smooth\_depth} \quad (2)$$

wherein $$f_{data} = \iint dxdy \rho(\Sigma_{i=2}{}^n \Sigma_{I=C_1}{}^{C_k}((I_{x,y}{}^1 - I_{u^i,v^i}{}^i)^2) + \beta(\nabla I_{x,y}{}^1 - \nabla I_{u^i,v^i}{}^i)^2)) \quad (3)$$

$$f_{smooth\_uv} = \alpha \iint dxdy \rho(\Sigma_{i=2}{}^n (|\nabla(u^i - x)|^2 + |\nabla(v^i - y)|^2)) \quad (4)$$

$$f_{smooth\_depth} = \tau_1 \iint dxdy \rho(|\nabla q|^2/q^2 + \tau_2 |\Delta q|^2/q^2) \quad (5)$$

the above objective function is described as below:

$$\nabla =: \left( \frac{\partial}{\partial x}, \frac{\partial}{\partial y} \right) \quad (a)$$

represents a gradient operator, $$\nabla =: \nabla^2 =: \nabla \cdot \nabla = \frac{\partial^2}{\partial x^2} + \frac{\partial^2}{\partial y^2}$$

represents a Laplacian operator; (b) the objective function comprises three parts, namely, a data term $f_{data}$, an offset smoothing term $f_{smooth\_uv}$ and a depth smoothing term $f_{smooth\_depth}$, wherein $\alpha$, $\beta$, $\tau_1$ and $\tau_2$ represent non-negative weights; (c) the image has k color components $C_1, \ldots, C_k$, $I_{x,y}{}^1$ represents a color I component value of the first image on a location (x,y), and correspondingly, $I_{u^i,v^i}{}^i$ represents a color I component value of an $i^{th}$ image on a location $(u^i, v^i)$; (d) a robust function $\rho$ is introduced for eliminating an influence from a dramatic change of the depth, the robust function $\rho$ is a Charbonnier function $\rho(x) = \sqrt{x + \epsilon}$, wherein $\epsilon$ represents an enough small positive number, $\epsilon < 10^{-6}$; or a Lorentzian function $$\rho(x) = \log\left(1 + \frac{x}{2\sigma^2}\right),$$

$\sigma$ represents a certain constant; when the robust function is not introduced, $\rho(x) = x$; (e) $u^i$ and $v^i$ are functions $u_{x,y}{}^i(P_i, q)$ and $v_{x,y}{}^i(P_i, q)$ defined in an image domain and with the camera projection matrix $P_i$ and the depth q as parameters, which represent an imaging location $(u_{x,y}{}^i, v_{x,y}{}^i)$ of the three-dimensional point to which the pixel (x,y) of the first image corresponds on the $i^{th}$ image, $$\begin{cases} u_{x,y}^i = \dfrac{P_{i,1}[q_{x,y} \times x, q_{x,y} \times y, q_{x,y}, 1]^T}{P_{i,3}[q_{x,y} \times x, q_{x,y} \times y, q_{x,y}, 1]^T} \\ v_{x,y}^i = \dfrac{P_{i,2}[q_{x,y} \times x, q_{x,y} \times y, q_{x,y}, 1]^T}{P_{i,3}[q_{x,y} \times x, q_{x,y} \times y, q_{x,y}, 1]^T} \end{cases}$$

wherein $P_{i,j}$ is a $j^{th}$ row vector of an $i^{th}$ camera projection matrix $P_i$; subscripts x,y of $u_{x,y}{}^i$ and $v_{x,y}{}^i$ are omitted for simplifying an expression without confusion;

an iterative optimization algorithm designed on the continuous domain is particularly as follows: the depth of the three-dimensional scenario is a continuous function defined on a first image domain, and has to meet an Euler-Lagrangian equation at an extreme point; and at the extreme point, a partial derivative of a parameter of the camera projection matrix is 0; at a discrete lattice of the image, in combination of the Euler-Lagrangian equation and an equation that the partial derivative of the parameter of the camera projection matrix is 0, and by employing an incremental mode expression form, an iterative process of solving the camera projection matrix and an increment of the depth of the three-dimensional scenario can be transformed into a process of solving the following linear system of equations $$H\delta\theta + b = 0 \quad (6)$$

wherein a vector $\theta$ is constructed sequentially by the camera projection matrix $P_i$ $2 \le i \le n$ and the depth q of the three-dimensional scenario; thus, each iteration comes down to solve $$\delta\theta = -H^{-1}b \quad (7),$$

so as to obtain corresponding increments $\delta P_i$ and $\delta q$; parameters $P_i$ and q are updated according to the obtained increments, $P_i \leftarrow \delta P_i + P_i$, $q \leftarrow \delta q + q$, until convergence;

that is, a process of the algorithm 1 particularly comprises:

inputting n images, initializing the depth q of the three-dimensional scenario and the camera projection matrix $P_i$, $2 \le i \le n$;

outputting the camera projection matrix $P_i(2 \le i \le n_i)$, the depth q of the three-dimensional scenario and a three-dimensional representation of the scenario;

1. iterating

1). determining the H and the b in a formula (7) according to the Euler-Lagrangian equation and the objective function that the partial derivative of the parameter of the camera projection matrix is 0;

2). calculating an increment $\delta\theta$ by the formula (7), and determining corresponding increments $\delta P_i$ and $\delta q$;

3). updating parameters $P_i$, $2 \leq i \leq n$ and q: $P_i \leftarrow \delta P_i + P_i$, $q \leftarrow \delta q + q$; until convergence 2. calculating the three-dimensional representation of the scenario by the formula (1) according to the converged depth q of the three-dimensional scenario.

The above color images may be represented by employing common RGB or HSV. By taking the RGB as an example, an image has three components, red (R), green (G) and blue (B) components; color components may be a combination of different formats, such as four components of R, G, B and H. There are a wide variety of selections for the above robust function, which is not limited to the function listed above.

A basis of the objective function f(P,q) established in the formula (1) is similar to optical flow computation to some extent, that is, a gray value constancy assumption and a smoothing assumption of pixel offsets $u^i-x$ and $v^i-y$ respectively correspond to the first part $\rho(\Sigma_{i=2}{}^n \Sigma_{l=C_1}{}^{C_k}(I_{x,y}{}^1 - I_{u,v}{}^i)^2) + \beta(\nabla I_{x,y}{}^1 - \nabla I_{u,v}{}^i)^2)$ and the second part $\alpha\rho(\Sigma_{i=2}{}^n(|\nabla(u^i-x)|^2 + |\nabla(v^i-y)|^2))$, namely, a data term and a smoothing term, in the objective function. The third part $\tau_1 \rho(|\nabla q|^2/q^2 + \tau_2 |\Delta q|^2/q^2)$ in the formula (1) corresponds to a smoothing assumption of the depth.

Furthermore, the data term and the offset smoothing term of the objective function can employ other similar variations:

$$f_{data} = \iint dxdy \rho(\Sigma_{i=1}{}^n \Sigma_{l=C_1}{}^{C_k}((\bar{I}_{x,y} - I_{u^i,v^i})^2) + \beta(\nabla \bar{I}_{x,y} - \nabla I_{u^i,v^i})^2)) \quad (8)$$

$$f_{smooth\_uv} = \alpha \iint dxdy \rho(\Sigma_{i=2}{}^n (|\nabla(u^i-u^{i-1})|^2 + |\nabla(v^i-v^{i-1})|^2)) \quad (9)$$

wherein $$\bar{I}_{x,y} = \frac{1}{n}\Sigma_{i=1}^n I_{u^i,v^i}^i, \quad I_{u^1,v^1}^1 = I_{x,y}^1, \quad \nabla \bar{I}_{x,y} = \frac{1}{n}\Sigma_{i=1}^n \nabla I_{u^i,v^i}^i$$

and $\nabla I_{u^1,v^1}^1 = \nabla I_{x,y}^1$.

The robust function can be introduced in other variations, the data term of the formula (3) has a further variation:

$$f_{data} = \iint dxdy \{\rho(\Sigma_{i=2}{}^n \Sigma_{l=C_1}{}^{C_k}(I_{x,y}^1 - I_{u^i,v^i}^i)^2) + \beta \rho(\Sigma_{i=2}{}^n \Sigma_{l=C_1}{}^{C_k}(\nabla I_{x,y}^1 - \nabla I_{u^i,v^i}^i)^2)\} \quad (10)$$

Similar to a situation on the continuous domain, an objective function in a discrete form is constructed particularly:

$$f(P_2, \ldots, P_n, q) = f_{data} + f_{smooth\_uv} + f_{smooth\_depth} \quad (11)$$

wherein $$f_{data} = \Sigma_{x,y} \rho(\Sigma_{i=2}{}^n \Sigma_{l=C_1}{}^{C_k}((I_{x,y}^1 - I_{u^i,v^i}^i)^2) + \beta(\nabla I_{x,y}^1 - \nabla I_{u^i,v^i}^i)^2)) \quad (12)$$

$$f_{smooth\_uv} = \alpha \Sigma_{x,y} \rho(\Sigma_{i=2}{}^n (|\nabla(u^i-x)|^2 + |\nabla(v^i-y)|^2)) \quad (13)$$

$$f_{smooth\_depth} = \tau_1 \Sigma_{x,y} \rho(|\nabla q|^2/q^2 + \tau_2 |\Delta q|^2/q^2) \quad (14)$$

an iterative optimization algorithm of the objective function in a discrete form (11) and a variation thereof is particularly as follows: the objective function in a discrete form (11) is essentially a non-linear least square problem, and can employ a common Levenberg-Marquardt algorithm or Guass-Newton algorithm, each iterative process comes down to solve a linear system of equations (15):

$$\delta\theta = -(H + \mu I)^{-1} b \quad (15)$$

wherein H represents a Hessian matrix or Guass-Newton Hessian matrix, b represents a gradient vector, $\mu$ represents a non-negative number, corresponding increments $\delta P_i$ and $\delta q$ are determined according to the Levenberg-Marquardt algorithm or Guass-Newton algorithm; parameters $P_i$ and q are updated according to the increments, $P_i \leftarrow \delta P_i + P_i$, $q \leftarrow \delta q + q$, until convergence;

a process of the algorithm 2 particularly comprises:

inputting multiple images, initializing the camera projection matrix $P_i$ and the depth q of the three-dimensional scenario, $2 \leq i \leq n$;

outputting the camera projection matrix $P_i$ ($2 \leq i \leq n$), the depth q of the three-dimensional scenario and a three-dimensional representation of the scenario;

1. iterating
   1). calculating the Guass-Newton Hessian matrix H and the gradient vector b in the formula (15);
   2). calculating an increment $\delta\theta$ by the formula (15), and determining corresponding increments $\delta P_i$ and $\delta q$ respectively;
   3). updating parameters $P_i$ and q: $P_i \leftarrow \delta P_i + P_i$, $q \leftarrow \delta q + q$, $2 \leq i \leq n$; until convergence;
2. calculating the three-dimensional representation of the scenario by the formula (1) according to the converged depth q of the three-dimensional scenario.

Furthermore, the from coarse to fine pyramid method particularly comprises the following steps: calculating n layers of pyramid representations of an image; at the coarsest image layer, initializing n−1 camera projection matrices to $P_i = [I_3, 0]$, $2 \leq i \leq n$, initializing depths of three-dimensional scenarios of all points to 1; estimating the camera projection matrices and the depths of the three-dimensional scenarios sequentially from coarse to fine, and respectively correcting and interpolating the camera projection matrices and the depths of the three-dimensional scenarios, which serve as initial values of an iterative process of the next fine image layer.

With regard to interpolation of the depths of the three-dimensional scenarios among different precision layers, it is achieved by employing a bilinear interpolation method, a bicubic interpolation method or other similar interpolation methods.

With regard to correction of the camera projection matrices among different precision layer, it is supposed that pixel ratios of the images with two adjacent precisions in x and y directions are $s_1$ and $s_2$, $s_1, s_2 < 1$, a camera projection matrix $P^{(k+1)}$ of a certain camera is estimated on an coarser image, wherein a superscript (k+1) represents a (k+1)$^{th}$ layer of a pyramid structure of the image, the camera projection matrix to which a $k^{th}$ layer of image corresponds is $$P^{(k)} = \begin{bmatrix} s_1 & 0 & 0 \\ 0 & s_2 & 0 \\ 0 & 0 & 1 \end{bmatrix} P^{(k+1)} = \begin{bmatrix} 1/s_1 & 0 & 0 & 0 \\ 0 & 1/s_2 & 0 & 0 \\ 0 & 0 & 1 & 0 \\ 0 & 0 & 0 & 1 \end{bmatrix} \quad (16)$$

an iterative algorithm of the from coarse to fine pyramid method is particularly as follows:

that is, a process of the algorithm 3 particularly comprises:

inputting multiple images;

outputting the camera projection matrix $P_i$ ($2 \leq i \leq n$), the depth q of the three-dimensional scenario and a three-dimensional representation of the scenario;

1. calculating m layers of pyramid representations of the image;
2. iterating: an image layer k, from an $m^{th}$ layer to a first layer sequentially (1) if k≠m on the basis of the estimated depth $q^{(k+1)}$ of a previous layer of the three-dimensional scenario, calculating a depth $q^{(k)}$ of a current layer of the three-dimensional scenario by employing an interpolation method, the depth $q^{(k)}$ serves as initialization of the depth of the three-dimensional scenario;

calculating a camera projection matrix $P_i^{(k)}$ of the current layer according to the formula (16) by using the estimated camera projection matrix $P_i^{(k+1)}$ of the previous layer of image, (2≤i≤n), the camera projection matrix $P_i^{(k)}$ serves as initialization of the camera projection matrix;

otherwise, at an $m^{th}$ layer of image, initiating: a camera projection matrix of an $i^{th}$ camera is set to $P_i^{(m)}=[I_3\ 0]$, (2≤i≤n), depth information of three-dimensional scenarios of all points is set to $q^{(m)}=1$;

end (2) estimating the camera projection matrix $P_i^{(k)}$, (2≤i≤n) of the current layer and the depth $q^{(k)}$ of the three-dimensional scenario by employing the algorithm 1 or algorithm 2;

3. outputting the camera projection matrix and the depth of the three-dimensional scenario: $P_i \leftarrow P_i^{(1)}$(2≤i≤n), $q \leftarrow q^{(1)}$.

4. calculating the three-dimensional representation of the scenario by the formula (1) according to the depth q of the three-dimensional scenario.

Furthermore, a process of realizing similarity three-dimensional reconstruction or Euclidean three-dimensional reconstruction particularly comprises:

parameterization is particularly as follows: a camera projection matrix is described by camera internal parameters and camera external parameters:

P=K[R t]

wherein the camera internal parameters $\alpha_x$, $\alpha_y$, s, $p_x$ and $p_y$ are included in a 3×3 matrix $$K = \begin{bmatrix} \alpha_x & 0 & p_x \\ 0 & \alpha_y & p_y \\ 0 & 0 & 1 \end{bmatrix},$$

the camera external parameters are determined by a 3×3 rotation matrix R and a 3×1 translation vector t, the rotation matrix R is determined by three angle parameters, namely, rotation angles $\gamma_x$, $\gamma_y$ and $\gamma_z$ which are respectively about an x axis, a y axis and a z axis:

$$R = \begin{bmatrix} 1 & 0 & 0 \\ 0 & \cos(\gamma_x) & -\sin(\gamma_x) \\ 0 & \sin(\gamma_x) & \cos(\gamma_x) \end{bmatrix} \begin{bmatrix} \cos(\gamma_y) & 0 & \sin(\gamma_y) \\ 0 & 1 & 0 \\ -\sin(\gamma_y) & 0 & \cos(\gamma_y) \end{bmatrix} \begin{bmatrix} \cos(\gamma_z) & -\sin(\gamma_z) & 0 \\ \sin(\gamma_z) & \cos(\gamma_z) & 0 \\ 0 & 0 & 1 \end{bmatrix}$$

when the camera internal parameters and the camera external parameters are both unknown, the camera internal parameters $\alpha_x$, $\alpha_y$, s, $p_x$, $p_y$, the translation vector t, the rotation angles $\gamma_x$, $\gamma_y$ and $\gamma_z$ and the depth q of the three-dimensional scenario are to-be-estimated undetermined parameters in realizing the similarity three-dimensional reconstruction;

when the camera internal parameters are known while the camera external parameters are unknown, the translation vector t, the rotation angles $\gamma_x$, $\gamma_y$ and $\gamma_z$ and the depth q of the three-dimensional scenario are to-be-estimated undetermined parameters in realizing the similarity three-dimensional reconstruction;

when the camera internal parameters and the camera external parameters are both known, the depth q of the three-dimensional scenario is a to-be-estimated undetermined parameter in realizing Euclidean three-dimensional reconstruction.

Furthermore, the present invention can be applied to a situation of a large baseline, which particularly comprises the following steps: in projective geometry, the situation of the large baseline refers to a situation that a relative motion among cameras is relatively large, resulting in significant distinction between images, in the situation of the large baseline, SFM three-dimensional reconstruction particularly comprises three steps:

a first step: extracting features from images and matching, wherein the extracted features include a Harris feature, a SIFT feature or a KLT feature;

a second step: based on the extracted features, estimating three-dimensional information of feature points and a camera projection matrix of cameras;

a third step: based on the first step and the second step, realizing dense SFM three-dimensional reconstruction by utilizing the algorithm wherein the estimated camera projection matrix in the second step serves as an initial value of the camera projection matrix in the third step, and the estimated depth of the three-dimensional scenario in the second step is interpolated, and the interpolated depth serves as an initial value of the depth of the three-dimensional scenario in the third step.

As compared to the prior art, the present invention has the advantageous effect: the present invention provides a non-feature extraction dense SFM three-dimensional reconstruction method, which can accomplish dense three-dimensional reconstruction with one step in comparison with an existing SFM three-dimensional reconstruction method. Because estimating three-dimensional information is realized by one-step optimization, and an optimal solution or at least a locally optimal solution can be obtained by using the objective function as an index, it is significantly improved over an existing method and has been preliminarily verified by experiments.

BRIEF DESCRIPTION OF THE DRAWINGS

The sole FIGURE is flow chart of realizing three-dimensional reconstruction according to the present invention.

DETAILED DESCRIPTION OF THE INVENTION

The present invention will be further described below, however, implementation manners of the present invention is not limit to this.

As shown in the sole FIGURE, S1. inputting n images about a certain scenario, n≥2;

S2. establishing a world coordinate system consistent with a certain camera coordinate system, it is supposed that the world coordinate system is consistent with a camera coordinate system of a first camera, that is, an origin, an x axis and a y axis of the world coordinate system being coincident with a camera center of the first camera, an x axis and a y axis of an imaging plane of the first camera, and its z axis being directed perpendicularly to the imaging plane of the first camera;

S3. taking a depth of a three-dimensional scenario and a camera projection matrix as variables, the depth of the three-dimensional scenario referring to a depth q of a three-dimensional space point to which a pixel point of the first image corresponds; and the camera projection matrix referring to a 3×4 matrix $P_i$ of the other (n−1) images, 2≤i≤n;

S4. constructing an objective function similar to optical flow estimation, the objective function being a variational objective function on a continuous domain or an objective function in a discrete form thereof;

S5. designing an iterative algorithm on a continuous domain or discrete domain by employing a from coarse to fine pyramid method to optimize the objective function, so as to output a depth representing three-dimensional information of the scenario and a camera projection matrix representing relative location and pose information of the camera; and S6. realizing dense projective, similarity or Euclidean reconstruction according to the depth representing the three-dimensional information of the scenario.

Various implementation manners of three-dimensional reconstruction are listed below.

A. Projective Three-dimensional Reconstruction Based on Two Gray Value Images in a Continuous Domain In this section, a core model, projective three-dimensional reconstruction based on two gray value images on a continuous domain, of the present invention is introduced. Supposing a first image and a second image respectively are $I^1$ and $I^2$ and (a superscript represents an image serial number), a gray value of the first image on a location (x,y) is $I_{x,y}^1$, and correspondingly, a gray value of the second image on a location (u,v) is $I_{u,v}^2$. Although currently captured images are mostly digital images, that is, images are defined on discrete lattices, a solution, which is provided in this section, of the present invention supposes that the images are defined on a continuous domain, three-dimensional reconstruction is realized by employing a numerical optimization algorithm To particularly depict three-dimensional information, a world coordinate system is established as below: origin, an origin, an x axis and a y axis of the world coordinate system being coincident with a camera center of the first camera, an x axis and a y axis of an imaging plane of the first camera, and its z axis being directed perpendicularly to the imaging plane of the first camera.

According to a projective geometry principle, it is supposed that a camera projection matrix of the first camera is $[I_3\ 0] \in R^{3,4}$, wherein $I_3$ represents a 3×3 unit matrix, 0 represents a 3×1 zero vector; it is supposed that a camera projection matrix of the second camera is a 3×4 matrix $P \in R^{3,4}$. Meanwhile, it is supposed that a three-dimensional point to which a pixel (x,y) of the first image corresponds has a depth $q_{x,y}$, that is, a z coordinate $q_{x,y}$; correspondingly, a three-dimensional coordinate of the three-dimensional point is $$(q_{x,y} \times x, q_{x,y} \times y, q_{x,y}) \quad (1)$$

in this way, a three-dimensional structure of the captured scenario or object is described by the depth $q_{x,y}$ defined in the first image; and the camera projection matrix P of the second camera describes relative motion information between two cameras. The projective three-dimensional reconstruction aims to estimate depth information $q_{x,y}$ (in a case of knowing the depth information $q_{x,y}$, the corresponding three-dimensional coordinate may be calculated by the formula (1)) of the scenario and the camera projection matrix P.

According to the projective geometry principle, an imaging location $(u_{x,y}, v_{x,y})$ of a three-dimensional point to which the pixel (x,y) of the first image corresponds in the second image is as follows:

$$\begin{cases} u_{x,y} = \dfrac{P_1[q_{x,y} \times x, q_{x,y} \times y, q_{x,y}, 1]^T}{P_3[q_{x,y} \times x, q_{x,y} \times y, q_{x,y}, 1]^T} \\ v_{x,y} = \dfrac{P_2[q_{x,y} \times x, q_{x,y} \times y, q_{x,y}, 1]^T}{P_3[q_{x,y} \times x, q_{x,y} \times y, q_{x,y}, 1]^T} \end{cases} \quad (2)$$

wherein $P_j$ is a $j^{th}$ row vector of the camera projection matrix P. Subscripts x, y are omitted for simplifying an expression without confusion. It may be seen from (2), u and v are functions u(P,q) and v(P,q) defined on an image domain and with the camera projection matrix P and the depth q as parameters.

To realize projective three-dimensional reconstruction, a variational objective function is constructed as below:

$$f(P,q) = \iint dx dy \{ (I_{x,y}^1 - I_{u,v}^2)^2 + \alpha(|\nabla(u-x)|^2 + |\nabla(v-y)|^2) \} \quad (3)$$

wherein $$\nabla := \left( \frac{\partial}{\partial x}, \frac{\partial}{\partial y} \right)$$

represents a gradient factor, a first part of the objective function (3) is based on a gray value constancy assumption in optical flow computation, that is, the same three-dimensional space point has same gray value in different images. If only gray value constancy assumption is provided, this optimization problem is an ill-conditioned problem. Accordingly, a second part is introduced into the objective function (3), it is supposed that imaging in the two images has smoothing offsets u−x and v−y, the smoothing assumption is depicted by the second part of the objective function (3). Two parts of the objective function (3) are respectively called a data term and a smoothing term, which correspond to a data term and a smoothing term in the optical flow computation.

The objective function (3) is optimized by employing an iterative algorithm in the present invention. Its core concept is an Euler-Lagrangian equation in calculus of variations. To meet a standard form of the Euler-Lagrangian equation in calculus of variations, an integral L in the optimized objective function (3) is defined as below (the camera projection matrix parameter P is temporarily omitted instead of taking account of a depth parameter q only):

$$L(x,q,q_x,q_y) = (I_{x,y}^1 - I_{u,v}^2)^2 + \alpha(|\nabla(u-x)|^2 + |\nabla(v-y)|^2) \quad (4)$$

wherein $$\nabla(u-x) = \frac{\partial u}{\partial q} \nabla q - [1, 0]^T$$

and $$\nabla(v-y) = \frac{\partial v}{\partial q} \nabla q - [0, 1]^T.$$

according to the Euler-Lagrangian equation, for reaching an extreme value, the objective function (3) has to meet:

$$L_q - \frac{d}{dx} L_{q_x} - \frac{d}{dy} L_{q_y} = 0 \quad (5)$$

particularly, the Euler-Lagrangian equation (5) is:

$$(I_{u,v}^2 - I_{x,y}^1)\left(I_x\frac{\partial u}{\partial q} + I_y\frac{\partial v}{\partial q}\right) + \alpha\left(\frac{\partial u \partial^2 u}{\partial q \partial q^2} + \frac{\partial v \partial^2 v}{\partial q \partial q^2}\right)(q_x^2 + q_y^2) - \alpha\left(\frac{\partial^2 u}{\partial q^2}q_x + \frac{\partial^2 v}{\partial q^2}q_y\right) - \alpha\left(\left(\frac{\partial u}{\partial q}\right)^2 + \left(\frac{\partial v}{\partial q}\right)^2\right)div(\nabla q) = 0 \qquad (6)$$

meanwhile, according to a characteristic that a derivative at an extreme point is equal to 0, the objective function (3) meets:

$$\frac{\partial f}{\partial P} = 0$$

that is, $$\int\int dx dy \left\{ (I_{u,v}^2 - I_{x,y}^1)\left(I_x\frac{\partial u}{\partial P} + I_y\frac{\partial v}{\partial P}\right) + \alpha(q_x^2 + q_y^2) \right. \\ \left. \left(\frac{\partial u}{\partial q}\frac{\partial^2 u}{\partial q \partial P} + \frac{\partial v}{\partial q}\frac{\partial^2 v}{\partial q \partial P}\right) - q_x\frac{\partial^2 u}{\partial q \partial P} - q_y\frac{\partial^2 v}{\partial q \partial P} \right\} = 0 \qquad (7)$$

In the iterative algorithm, current estimation of P and q is obtained by previous iteration steps, each iteration process aims to solve increments $\delta P$ and $\delta q$ of P and q, parameters are updated as below:

$$\begin{cases} P \leftarrow P + \delta P \\ q \leftarrow q + \delta q \end{cases} \qquad (8)$$

To this end, $I_{u,v}^2$ of the formulas 6 and 7 is replaced with $$I_{u,v}^2 + I_x\left(\frac{\partial u}{\partial P}\delta P + \frac{\partial u}{\partial q}\delta q\right) + I_y\left(\frac{\partial v}{\partial P}\delta P + \frac{\partial v}{\partial q}\delta q\right),$$

wherein and $I_x$ and $I_y$ are partial derivatives of the second image at a location (u,v); and qx and qy are approximated by using a first difference of q+$\delta$q; div($\nabla$q) is replaced with div ($\nabla$(q+$\delta$q)). By combining increment forms of the formulas (6) and (7), n+12 linear equations with increments $\delta P$ and $\delta q$ as variables may be established on the image lattices, a number of the variables of this linear system of equations is also n+12. Wherein n represents a number of image pixels, that is, the depth q has n variables; the camera projection matrix has 12 variables.

For simplifying an expression, 12 variables of the camera projection matrix and n variables of the depth q construct a vector $\theta$ with a number of dimensions of n+12. By arrangement, the increment forms of the formulas (6) and (7) may be expressed as a linear system of equations as below:

$$H\delta\theta + b = 0 \qquad (9)$$

in this way, each iteration comes down to solve $$\delta\theta = -H^{-1}b \qquad (10)$$

To sum up, given two gray value images, as well as the camera projection matrix and an initial value of the depth, SFM projective three-dimensional reconstruction may be realized by employing an algorithm as below.

that is, a process of an algorithm 1 particularly comprises:
inputting two gray value images $I^1$ and $I^2$, and initializing a camera projection matrix P and a depth q;
outputting the camera projection matrix P and the depth q;
iterating
1. determining H and b of the formula (9) by the formulas (6) and (7);
2. calculating an increment $\delta\theta$ by the formula (10), and determining corresponding increments $\delta P$ and $\delta q$;
3. updating parameters P and q by the formula (8); until convergence.

To overcome a difficulty of a local extreme point, a from coarse to fine pyramid method is employed. That is, firstly, realizing three-dimensional reconstruction at an image with lower resolution; secondly, interpolating the estimated depth, and correcting the camera projection matrix, wherein the interpolated depth and the corrected camera projection matrix serve as an initial solution of three-dimensional reconstruction of the next layer with higher resolution; until highest resolution.

With regard to interpolation of the depth, it is achieved by employing a bilinear interpolation method, a bicubic interpolation method or other similar interpolation methods.

With regard to correction of the camera projection matrices among different precision layer, it is supposed that pixel ratios of the images with two adjacent precisions in x and y directions are $s_1$ and $s_2$, $(s_1, s_2 < 1)$, a projection matrix $P^{(i+1)}$ of a second camera is estimated at an coarser layer (wherein a superscript (i+1) represents a $(i+1)^{th}$ layer of a pyramid structure of the image, the projection matrix of the second camera to which an $i^{th}$ layer of image corresponds is $$P^{(i)} = \begin{bmatrix} s_1 & 0 & 0 \\ 0 & s_2 & 0 \\ 0 & 0 & 1 \end{bmatrix} P^{(i+1)} \begin{bmatrix} 1/s_1 & 0 & 0 & 0 \\ 0 & 1/s_2 & 0 & 0 \\ 0 & 0 & 1 & 0 \\ 0 & 0 & 0 & 1 \end{bmatrix} \qquad (11)$$

that is, a process of an algorithm 2 particularly comprises:
inputting two gray value images;
outputting a camera projection matrix P and a depth q;
1. calculating m layers of pyramid representations of the two images;
2. for i=m:−1:1
If i≠m
based on the depth $q^{(i+1)}$ estimated at the previous layer, calculating depth $q^{(i)}$ at a current layer by employing an interpolation method, wherein the depth $q^{(i)}$ serves as initialization of the depth;
by utilizing the camera projection matrix $P^{(i+1)}$ estimated at the previous layer, calculating a camera projection matrix $P^{(i)}$ of the current layer by the formula (11), the camera projection matrix $P^{(i)}$ serves as initialization of the projection matrix of the second camera;
else
initializing: the projection matrix of the second camera is set to $P^{(m)}=[I_3\ 0]$, and depth information of all points is set to $q^{(m)}=1$;
end
estimating the camera projection matrix $P^{(i)}$ and the depth $q^{(i)}$ of this layer by employing the algorithm
end B. Discretization Form of Projective Three-dimensional Reconstruction Based on Two Gray Value Images B.

Because digital images exist in a discrete form, the discrete form of the objective function (3) is directly given below:

$$\Sigma_{x,y}\{(I_{x,y}^1 - I_{u,v}^2)^2 + \alpha(|\nabla(u-x)|^2 + |\nabla(v-y)|^2)\} \qquad (12)$$

The objective function (12) is essentially a non-linear least square problem, and can employ a Guass-Newton algorithm (or other similar algorithms, such as Levenberg-Marquardt, a LM algorithm) to realize iterative optimization. For the sake of simplicity, a situation of using u and v as variables is firstly considered. For the first part, namely, the data item, of the objective function (12), a relevant Guass-Newton Hessian matrix $H_{data}$ and a gradient vector $b_{data}$ may be obtained by employing a Guass-Newton similarity method:

$$\begin{cases} H_{data} = 2\sum \begin{bmatrix} I_x \\ I_y \end{bmatrix} [I_x \ I_y] \\ b_{data} = 2\sum (I_{u,v}^2 - I_{x,y}^1) \begin{bmatrix} I_x \\ I_y \end{bmatrix} \end{cases} \quad (13)$$

For a second part, a smoothing term, of the objective function (12), a partial derivative in the smoothing term is replaced with a first difference. Particularly, $$\frac{\partial u}{\partial x}\bigg|_{(x,y)} \leftarrow u_{x,y} - u_{x-1,y}$$

and $$\frac{\partial u}{\partial y}\bigg|_{(x,y)} \leftarrow u_{x,y} - u_{x,y-1};$$

similarly, $$\frac{\partial v}{\partial x}\bigg|_{(x,y)} \leftarrow v_{x,y} - v_{x-1,y}$$

and $$\frac{\partial v}{\partial y}\bigg|_{(x,y)} \leftarrow v_{x,y} - v_{x,y-1}.$$

A partial derivative may be approximated by employing other forms of difference, for example, $$\frac{\partial u}{\partial x}\bigg|_{(x,y)} \leftarrow (u_{x+1,y} - u_{x-1,y})/2,$$

these tiny variances may not change an overall structure of the algorithm.

Because difference calculation is involved of neighboring pixels, a derivation of a smoothing term is simpler than a data term (13), and there a need for analyzing a single pixel point. Similar to an iterative algorithm 1, u and v have been estimated from previous iteration, and each iteration aims to obtain its increments δu and δv. In this way, the smoothing term of the objective function (12) may be expressed as:

$$|\nabla(u-x)|^2 = (u_{x,y} + \delta u_{x,y} - u_{x-1,y} - \delta u_{x-1,y} - 1)^2 + (u_{x,y} + \delta u_{x,y} - u_{x,y-1} - \delta u_{x,y-1})^2$$

$$|\nabla(v-y)|^2 = (v_{x,y} + \delta v_{x,y} - v_{x-1,y} - \delta v_{x-1,y} - 1)^2 + (v_{x,y} + \delta v_{x,y} - v_{x,y-1} - \delta v_{x,y-1} - 1)^2$$

A sum of the above two terms may be represented by using the Guass-Newton Hessian matrix $H_{x,y}$ and the gradient vector $b_{x,y}$:

$$\frac{1}{2}\delta_{x,y}^T H_{x,y} \delta_{x,y} + \delta_{x,y}^T b_{x,y} \quad (14)$$

wherein $$\delta_{x,y} = [\delta u_{x-1,y} \ \delta u_{x,y} \ \delta u_{x,y-1} \ \delta v_{x-1,y} \ \delta v_{x,y} \ \delta v_{x,y-1}]^T,$$

$$H = 2\begin{bmatrix} C & 0 \\ 0 & C \end{bmatrix},$$

$$C = \begin{bmatrix} 1 & -1 & 0 \\ -1 & 2 & -1 \\ 0 & -1 & 1 \end{bmatrix},$$

$$b = 2[-u_{x,y}^x \ u_{x,y}^x + u_{x,y}^y \ -u_{x,y}^y \ -v_{x,y}^x \ v_{x,y}^x + v_{x,y}^y \ -v_{x,y}^y]^T,$$

$$u_{x,y}^x = u_{x,y} - u_{x-1,y} - 1,$$

$$u_{x,y}^y = u_{x,y} - u_{x,y-1},$$

$$v_{x,y}^x = v_{x,y} - v_{x-1,y},$$

$$v_{x,y}^y = v_{x,y} - v_{x,y-1} - 1$$

Guass-Newton similarity, which is similar to (14), of all pixels is established, and the Gauss-Newton Hessian matrix $H_{smooth}$ and the gradient vector of the smoothing $b_{smooth}$ item are obtained by combining the (14) and the Guass-Newton similarity $$\begin{cases} H_{smooth} = \alpha \sum H_{x,y} \\ b_{smooth} = \alpha \sum b_{x,y} \end{cases} \quad (15)$$

it should be noted that, an addition of a sum term in the formula (15) is different from an additional in an ordinary meaning, as may be seen from a definition of $\delta_{x,y}$ because each $\delta_{x,y}$ is involved of its neighboring pixel, alignment between $\delta_{x,y}$ is required to be considered in a sum operation in the formula (15).

In combination with the formula (13) and the formula (15), the Guass-Newton Hessian matrix H and the gradient vector b of the objective function (12) may be solved:

$$\begin{cases} H = H_{data} + H_{smooth} \\ b = b_{data} + b_{smooth} \end{cases} \quad (16)$$

Increments δu and δv may be obtained by solving the following equation:

$$-H^{-1}b \quad (17)$$

In the solution provided by the present invention, final parameters are the camera projection matrix P and the depth q. As with derivation in the continuous domain, for simplifying an expression, a parameter vector θ including the camera projection matrix P and the depth q is established. According to a compound function rule, an increment δθ is as follows:

$$\delta\theta = -(J^T H J)^{-1} J^T b \quad (18)$$

wherein a Jacobian matrix is $$J = \begin{bmatrix} \frac{\partial u}{\partial \theta} \\ \frac{\partial v}{\partial \theta} \end{bmatrix}.$$

That is, a process of an algorithm 3 particularly comprises:

inputting two gray value images $I^1$ and $I^2$, initializing a camera projection matrix P and a depth q;

outputting the camera projection matrix P and the depth q;

iterating 1. calculating H, J and b in the formula (18);
2. calculating an increment $\delta\theta$ by the formula (18), and giving corresponding increments $\delta P$ and $\delta q$ respectively;
3. updating parameters P and depth q by the formula (8);

until convergence

Similarly, as with three-dimensional reconstruction in a continuous domain, three-dimensional reconstruction in a discrete form may be realized by employing a from coarse to fine pyramid method, a basic framework of the three-dimensional reconstruction is identical to the algorithm 2 Difference therebetween lies in that in discrete three-dimensional reconstruction, three-dimensional reconstruction of each layer is realized by employing the algorithm 2. For avoiding redundancy, a from coarse to fine pyramid three-dimensional reconstruction discrete algorithm is omitted here.

C. Three-dimensional Reconstruction Based on Two Color Images C.

For three-dimensional reconstruction based on color images, its principle is identical to that of the three-dimensional reconstruction based on gray value images. there are a wide variety of color image representation solutions, for example, RGB (Red Green Blue), HSV (Hue Saturation Value), HSL (Hue Saturation Lightness) and HSI (Hue Saturation Intensity). By taking discrete three-dimensional reconstruction of a RGB color image as an example, how to perform three-dimensional reconstruction based on color images is interpreted. A discrete objective function is constructed as follows (similar to construction of the objective function on the continuous domain).

$$\Sigma_{x,y}\{(\Sigma_{I=R,G,B}(I_{x,y}{}^1-I_{u,v}{}^2)^2+\alpha(|\nabla(u-x)|^2+|\nabla(v-y)|^2)\} \quad (19)$$

an optimization algorithm of the objective function (19) is identical to that of the objective function (12), and is omitted here. In addition, three-dimensional reconstruction based on color images on the continuous domain may also be realized, an algorithm of realizing it is similar to that of realizing three-dimensional reconstruction based on gray value images on the continuous domain.

D. Three-dimensional Reconstruction Based on Multiple Images D.

For three-dimensional reconstruction based on n (n>2) images, its basic algorithm is identical to that of three-dimensional reconstruction based on two images, and thus, an objective function similar to the objective function (3) or (12) is constructed, which comprises a data term and a smoothing term. As with three-dimensional reconstruction based on two images, a world coordinate system may be set to a coordinate system of a first camera, in this way, a projection matrix of the first camera is $[I_3\ 0]\in R^{3,4}$, projection matrices of other n−1 cameras and depths q are to-be-estimated parameters.

For three-dimensional reconstruction based on multiple images, there a wide variety of different selections for constructing a data term and a smoothing term. Two different constructing solutions are provided respectively to the data term and the smoothing term, but not limited to this. A first solution for constructing the data term is as below:

$$\Sigma_{x,y}\Sigma_i(I_{u^i,v^i}{}^i-\bar{I}_{x,y})^2 \quad (20)$$

wherein $$\bar{I}_{x,y}=\frac{1}{n}\sum_{i=1}^{n}I_{u^i,v^i}^i$$

and $I_{u^1,v^1}{}^1=I_{x,y}{}^1$, superscripts represent an image sequence, $(u^i,v_i)$ represents a coordinate corresponding to (x,y) on an $i^{th}$ image. A second solution is as follows:

$$\Sigma_{x,y}\Sigma_{i=1}^{n-1}(I_{u^i,v^i}{}^i-I_{u^{i+1},v^{i+1}}{}^{i+1})^2 \quad (21)$$

In the first solution, a data item in the formula (20) is quite similar to that of two images (12), that is, gray value constancy assumption, it is supposed that the same point has same gray value in all images. In the second solution (21), gray value constancy assumption slightly varies, which only considers gray value constancy assumption between neighboring images. The second solution (21) is more suitable for three-dimensional reconstruction based on a video sequence.

In the smoothing term, two constructing solutions (22) and (23) are provided $$\Sigma_{x,y}\Sigma_{i=2}^{n}\alpha(|\nabla(u^i-x)|^2+|\nabla(v^i-y)|^2 \quad (22)$$

$$\Sigma_{x,y}\Sigma_{i=2}^{n}\alpha(|\nabla(u^i-u^{i-1})|^2+|\nabla(v^i-v^{i-1})|^2 \quad (23)$$

In the formula (22), an offset value is based on the first image, but an offset value between neighboring images is considered in the formula (23).

An algorithm of realizing three-dimensional reconstruction based on multiple images is similar to that of realizing three-dimensional reconstruction based on two images, and is not omitted particularly.

E. Gradient Constancy Assumption Introduced in Three-dimensional Reconstruction

To eliminate a change of an image due to different light conditions, gradient constancy assumption is introduced into an optimized objective function, that is, it is supposed that the same three-dimensional point remains a gradient in different images unchanged. By taking three-dimensional reconstruction based on two images as an example, how to introduce gradient constancy assumption in three-dimensional reconstruction is interpreted. Objective function is constructed as below:

$$\Sigma_{x,y}\{(I_{x,y}{}^1-I_{u,v}{}^2)^2+\beta(\nabla I_{x,y}{}^1-\nabla I_{u,v}{}^2+\alpha(|\nabla(u-x)|^2+|\nabla(v-y)|^2)\} \quad (24)$$

an iterative optimization algorithm of the formula (24) is consistent with the algorithm 3, and is omitted here.

F. Robust Function Introduced in Optimized Objective Function F.

Due to optimized objective functions (3) and (12) and in other similar constructions, a data term and a smoothing term are provided in a form of a quadratic term. Such model has an undesired effect when a depth of a scenario or object is not smooth. To this end, a certain robust function ρ is introduced in the optimized objective function. By taking the formula (12) as an example, $$\Sigma_{x,y}\{\rho(I_{x,y}{}^1-I_{u,v}{}^2)^2+\alpha\rho(|\nabla(u-x)|^2+°\nabla(v-y)|^2)\} \quad (25)$$

there are a wide variety of selections for the robust function ρ, such as a Charbonnier function $\rho(x)=\sqrt{x+\epsilon}$, wherein $\epsilon$ represents a very small positive number; the Lorentzian function $$\rho(x)=\log\left(1+\frac{x}{2\sigma^2}\right),$$

σ represents a certain constant.

G. Smoothness Constraint Introduced in Depth

Besides a smoothing restraint is introduced on a pixel offset, the smoothing restraint another is directly introduced in a depth q of a three-dimensional object according to another solution. By taking a discrete formula (12) as an example, an objective function may be constructed as below:

$$\Sigma_{x,y}\{(I_{x,y}{}^1 - I_{u,v}{}^2)^2 + \tau_1|\nabla q|^2/q^2 + \tau_2|\Delta q|^2/q^2\}$$

wherein $$\Delta q = \nabla^2 q = \nabla \cdot \nabla q = \frac{\partial^2 q}{\partial x^2} + \frac{\partial^2 q}{\partial y^2}.$$

The smoothing restraint is introduced in the pixel offset and the depth simultaneously according to another solution, and an optimized objective function is changed to:

$$\Sigma_{x,y}\{(I_{x,y}{}^1 - I_{u,v}{}^2)^2 + \alpha(|\nabla(u-x)|^2 + |\nabla(v-y)|^2) + \tau_1|\nabla q|^2/q^2 + \tau_2|\Delta q|^2/q^2\}$$

H. Similarity Three-dimensional Reconstruction and Euclidean Three-dimensional Reconstruction Based on Two Gray Value Images In the above solution of the present invention, a result of reconstruction is a projective three-dimensional structure, instead of a common Euclidean three-dimensional structure. This section proposes a similarity three-dimensional reconstruction solution and an Euclidean three-dimensional reconstruction solution.

According to a projective geometry principle, a projection matrix of a camera may be described by camera internal parameters and camera external parameters:

$$P = K[R\ t] \quad (26)$$

wherein the camera internal parameters $\alpha_x$、$\alpha_y$、$s$、$p_x$ and $p_y$ are included in a 3×3 matrix $$K = \begin{bmatrix} \alpha_x & s & p_x \\ 0 & \alpha_y & p_y \\ 0 & 0 & 1 \end{bmatrix},$$

and the camera external parameters are determined by a rotation matrix R and a translation vector t, wherein R depicts rotation transformation of a world coordinate system into a camera coordinate system.

Similar to the precious projective reconstruction, it is supposed that the world coordinate system is identical to the coordinate system of the first camera, in this way, motion information between cameras is entirely described by external parameters of the second camera. For the sake of simplicity, it is supposed that the two cameras have same internal parameters. To transform the projection matrix of the first camera into a standard form $[I_3\ 0]$, correspondingly, the form of the second camera is set to:

$$P = K[R\ t]K^{-1} \quad (27)$$

a depth parameter q of describing a scenario or object is identical to that of describing projective three-dimensional reconstruction.

A solution of realizing similarity three-dimensional reconstruction is similar to that of realizing projective reconstruction, that is, an optimized objective function (3) or (12). Difference therebetween lies in a form (27) of the projection matrix P of the second camera. A discrete solution of realizing similarity three-dimensional reconstruction is only provided here. As with a continuous solution of projective three-dimensional reconstruction, similarity three-dimensional reconstruction in a continuous domain may be realized.

A rotation matrix R is determined by three angle parameters, rotation angles $\gamma_x$、$\gamma_y$ and $\gamma_z$ which are respectively about an x axis, a y axis and a z axis:

$$R = \begin{bmatrix} 1 & 0 & 0 \\ 0 & \cos(\gamma_x) & -\sin(\gamma_x) \\ 0 & \sin(\gamma_x) & \cos(\gamma_x) \end{bmatrix} \begin{bmatrix} \cos(\gamma_y) & 0 & \sin(\gamma_y) \\ 0 & 1 & 0 \\ -\sin(\gamma_y) & 0 & \cos(\gamma_y) \end{bmatrix} \begin{bmatrix} \cos(\gamma_z) & -\sin(\gamma_z) & 0 \\ \sin(\gamma_z) & \cos(\gamma_z) & 0 \\ 0 & 0 & 1 \end{bmatrix}$$

it is supposed that in the projective three-dimensional reconstruction, previous 12 values of a n+12-dimensions parameter vector θ are camera projection matrix parameters, others are n depth parameters. Meanwhile, it is supposed that in similarity three-dimensional reconstruction, previous 11 values of a parameter vector θ' include 3 rotation angle parameters $\gamma = [\gamma_x z, 900\ \gamma_y z, 900\ \gamma_z]^T$, 3 translation vector parameters t and 5 camera internal parameters $\alpha_x$、$\alpha_y$、$s$、$p_x$ and $p_y$, which construct a 11-dimension vector θ" with 11 depth parameters thereafter. As for the formula (27), a Jacobian matrix is defined:

$$J' = \frac{\partial P}{\partial \theta''} \quad J'' = \begin{bmatrix} J' & 0 \\ 0 & I_n \end{bmatrix}$$

wherein $I_n$ represents a n×n unit matrix. Then, in the similarity three-dimensional reconstruction, an iterative process for solving a parameter increment is:

$$\delta\theta' = -(J''^T J^T H J J'')^{-1} J''^T J^T b \quad (28)$$

wherein H, J and b are H, J and b in the formula (18).

In a case where partial parameters of cameras are known, for example, when the cameras are standard, that is, camera internal parameters are known, the above similarity three-dimensional reconstruction may also be realized. In a case where camera internal parameters and camera external parameters are all known, Euclidean three-dimensional reconstruction may be realized.

I. SFM Three-dimensional Reconstruction in a Situation of a Large Baseline

In projective geometry, a large baseline refers to a situation that cameras have a large relative motion therebetween, resulting in significant distinction between images. Reasons may be found in excessively large rotation angle or translation between cameras, or excessively large difference of focal lengths between cameras. Under a condition of the large baseline, SFM three-dimensional reconstruction of the large baseline may be realized by combining with an existing three-dimensional reconstruction method and a solution preciously proposed by the present invention. Particularly, SFM three-dimensional reconstruction comprises three steps, a first step: extracting features from images and matching, such as a Harris feature, a SIFT feature or a KLT feature; a second step: based on the extracted features, estimating three-dimensional information of feature points and camera projection matrices of the cameras; a third step: based on the first step and the second step, realizing dense SFM three-dimensional reconstruction by utilizing the method previously proposed. Wherein the estimated camera projection matrices in the second step serve as initial values of the camera projection matrices in the third step, and the estimated depth of the three-dimensional scenario in the second step is interpolated and as the interpolated depth serves as an initial value of the depth of the three-dimensional scenario in the third step.

TERMS BOTH IN ENGLISH AND CHINESE structure from motion (SFM)
dense
camera projection matrix
projective
similarity
Euclidean
lattice
variational
Euler-Lagrange equation
from coarse to fine
pyramid
Gauss-Newton algorithm
Gauss-Newton Hessian matrix
Hessian matrix
internal parameters
external parameters
large baseline The above-described embodiments of the present invention are not limited to the protective scope of the present invention. Modifications, equivalent substitutions, improvements and the like may be made within the spirit or principle of the present invention, all of which should be included within the protective scope of the claims of the present invention.

What is claimed:

1. A non-feature extraction dense SFM three-dimensional reconstruction method, comprising the following steps: inputting n images about a certain scenario, n≥2; establishing a world coordinate system consistent with a certain camera coordinate system, it is supposed that said world coordinate system is consistent with a coordinate system of a first camera, an origin, an x axis and a y axis of said world coordinate system being coincident with a camera center of said first camera, an x axis and a y axis of an imaging plane of said first camera, and its z axis being directed perpendicularly to said imaging plane of said first camera; taking a depth of a three-dimensional scenario and a camera projection matrix as variables, said depth of said three-dimensional scenario referring to a depth q of a three-dimensional space point to which a pixel point of said first image corresponds; and said camera projection matrix referring to 3×4 matrix $P_i$ of the other (n−1) images, 2≤i≤n; constructing an objective function similar to optical flow estimation, said objective function being a variational objective function on a continuous domain or an objective function in a discrete form thereof; designing an iterative algorithm on a continuous domain or discrete domain by employing a from coarse to fine pyramid method to optimize said objective function, so as to output a depth representing three-dimensional information of said scenario and a camera projection matrix representing relative location and pose information of said camera; and realizing dense projective, similarity or Euclidean reconstruction according to said depth representing said three-dimensional information of said scenario.

2. The non-feature extraction dense SFM three-dimensional reconstruction method according to claim 1, wherein during realizing projective three-dimensional reconstruction, parameterization is particularly as follows: a camera projection matrix of a first camera is $[I_3 \ 0] \in R^{3,4}$ while a world coordinate system is established, wherein $I_3$ represents a 3×3 unit matrix, 0 represents a 3×1 zero vector; projection matrices $P_i \in R^{3,4}$ of other cameras are to-be-estimated unknown parameters, 2≤i≤n; a three-dimensional structure of a scenario is determined by a depth of a three-dimensional scenario defined in a first image: it is supposed that a depth of a three-dimensional scenario of a three-dimensional space point to which a pixel (x,y) of said first image corresponds is $q_{x,y}$, a three-dimensional coordinate of this three-dimensional point is $$(q_{x,y} \times x, q_{x,y} \times y, q_{x,y}) \tag{1},$$

in said projective three-dimensional reconstruction, said camera projection matrix $P_i$ and the depth $q_{x,y}$ of said three-dimensional scenario are to-be-estimated unknown parameters, and subscripts x, y are omitted for simplifying an expression without confusion.

3. The non-feature extraction dense SFM three-dimensional reconstruction method according to claim 2, wherein a process of realizing projective three-dimensional reconstruction on a continuous domain is particularly as follows: the constructed objective function on the continuous domain is particularly as follows:

$$f(P_2, \ldots, P_n, q) = f_{data} + f_{smooth\_uv} + f_{smooth\_depth} \tag{2}$$

wherein $$f_{data} = \iint dxdy \rho(\Sigma_{i=2}^n \Sigma_{I=C_1}^{C_k}((I_{x,y}^1 - I_{u^i,v^i}^i)^2) + \beta(\nabla I_{x,y}^1 - \nabla I_{u^i,v^i}^i)^2)) \tag{3}$$

$$f_{smooth\_uv} = \alpha \iint dxdy \rho(\Sigma_{i=2}^n (|\nabla(u^i - x)|^2 + |\nabla(v^i - y)|^2)) \tag{4}$$

$$f_{smooth\_depth} = \tau_1 \iint dxdy \rho(|\nabla q|^2/q^2 + \tau_2 |\Delta q|^2/q^2) \tag{5}$$

the above objective function is described as below:

$$\nabla := \left(\frac{\partial}{\partial x}, \frac{\partial}{\partial y}\right) \tag{a}$$

represents a gradient operator, $$\nabla := \nabla^2 := \nabla \cdot \nabla = \frac{\partial^2}{\partial x^2} + \frac{\partial^2}{\partial y^2}$$

represents a Laplacian operator; (b) said objective function comprises three parts, namely, a data term $f_{data}$, an offset smoothing term $f_{smooth\_uv}$ and a depth smoothing term $f_{smooth\_depth}$, wherein α ╲ β ╲ $\tau_1$ and $\tau_2$ represent non-negative weights; (c) an image has k color components $C_1, \ldots, C_k$, $I_{x,y}^1$ represents a color I component value of a first image on a location (x,y), and correspondingly, $I_{u^i,v^i}^i$ represents a color I component value of an $i^{th}$ image location on a location $(u^i, v^i)$; (d) a robust function ρ is introduced for eliminating an influence from a dramatic change of a depth, said robust function ρ is a Charbonnier function $\rho(x) = \sqrt{x + \epsilon}$, wherein ϵ represents an enough small positive number, $\epsilon < 10^{-6}$; or a Lorentzian function $$\rho(x) = \log\left(1 + \frac{x}{2\sigma^2}\right),$$

σ represents a certain constant; when said robust function is not introduced, ρ(x)=x; (e) $u^i$ and $v^i$ are functions $u_{x,y}^i(P_i,q)$ and $v_{x,y}^i(P_i,q)$ defined in an image domain and with the camera projection matrix $P_i$ and the depth q as parameters, which represent an imaging location $(u_{x,y}^i, v_{x,y}^i)$ of a three-dimensional point to which a pixel (x,y) of said first image corresponds on said $i^{th}$ image, $$\begin{cases} u_{x,y}^i = \dfrac{P_{i,1}[q_{x,y} \times x, q_{x,y} \times y, q_{x,y}, 1]^T}{P_{i,3}[q_{x,y} \times x, q_{x,y} \times y, q_{x,y}, 1]^T} \\ v_{x,y}^i = \dfrac{P_{i,2}[q_{x,y} \times x, q_{x,y} \times y, q_{x,y}, 1]^T}{P_{i,3}[q_{x,y} \times x, q_{x,y} \times y, q_{x,y}, 1]^T} \end{cases}$$

wherein $P_{i,j}$ is a $j^{th}$ row vector of an $i^{th}$ camera projection matrix $P_i$; subscripts x,y of $u_{x,y}^i$ and $v_{x,y}^i$ are omitted for simplifying an expression without confusion; an iterative optimization algorithm designed on a continuous domain is particularly as follows: a depth of a three-dimensional scenario is a continuous function defined on a first image, and has to meet an Euler-Lagrangian equation at an extreme point; and at said extreme point, a partial derivative of a parameter of said camera projection matrix is 0; at a discrete lattice of said image, in combination of an Euler-Lagrangian equation and an equation that a partial derivative of a parameter of a camera projection matrix is 0, and by employing an incremental mode expression form, an iterative process of solving said camera projection matrix and an increment of said depth of said three-dimensional scenario can be transformed into a process of solving the following linear system of equations $$H\delta\theta + b = 0 \qquad (6)$$

wherein a vector θ is constructed sequentially by said camera projection matrix $P_i$, 2≤i≤n and said depth q of said three-dimensional scenario; thus, each iteration comes down to solve $$H\delta\theta + b = 0 \qquad (7),$$

so as to obtain corresponding increments $\delta P_i$ and $\delta q$; parameters $P_i$ and q are updated according to the obtained increments, $P_i \leftarrow \delta P_i + P_i$, $q \leftarrow \delta q + q$ until convergence; that is, a process of an algorithm 1 particularly comprises: inputting n images, initializing a depth q of a three-dimensional scenario and a camera projection matrix $P_i$, 2≤i≤n; outputting said camera projection matrix $P_i$ (2≤i≤$n_i$), said depth q of said three-dimensional scenario and a three-dimensional representation of said scenario; iterating:

determining H and b in a formula (7) according to an Euler-Lagrangian equation and an objective function that a partial derivative of a parameter of a camera projection matrix is 0; calculating an increment δθ by said formula (7), and determining corresponding increments $\delta P_i$ and $\delta q$; updating parameters $P_i$, 2≤i≤n and q: $P_i \leftarrow \delta P_i + P_i$, $q \leftarrow \delta q + q$; until convergence calculating said three-dimensional representation of said scenario by said formula (1) according to the converged depth q of said three-dimensional scenario.

4. The non-feature extraction dense SFM three-dimensional reconstruction method according to claim 3, wherein a data term and an offset smoothing term of an objective function (2) can employ other similar variations:

$$f_{data} = \iint dxdy \rho(\Sigma_{i=1}^n \Sigma_{I=C_1}^{C_k}((\bar{I}_{x,y} - I_{u^i,v^i})^2) + \beta(\nabla \bar{I}_{x,y} - \nabla I_{u^i,v^i})^2)) \qquad (8)$$

$$f_{smooth\_uv} = \alpha \iint dxdy \rho(\Sigma_{i=2}^n (|\nabla(u^i - u^{i-1})|^2 + |\nabla(v^i - v^{i-1})|^2)) \qquad (9)$$

wherein $$\bar{I}_{x,y} = \frac{1}{n}\sum_{i=1}^n I_{u^i,v^i}^i, \quad I_{u^1,v^1}^1 = I_{x,y}^1, \quad \nabla \bar{I}_{x,y} = \frac{1}{n}\sum_{i=1}^n \nabla I_{u^i,v^i}^i$$

and $\nabla I_{u^1,v^1}^1 = \nabla I_{x,y}^1$;

a robust function can be introduced in other variations, said data term of the formula (3) has a further variation:

$$f_{data} = \iint dxdy \{\rho(\Sigma_{i=2}^n \Sigma_{I=C_1}^{C_k}(I_{x,y}^1 - I_{u^i,v^i})^2) + \beta\rho(\Sigma_{i=2}^n \Sigma_{I=C_1}^{C_k}(\nabla I_{x,y}^1 - \nabla I_{u^i,v^i})^2)\} \qquad (10)$$

5. The non-feature extraction dense SFM three-dimensional reconstruction method according to claim 2, wherein an objective function in a discrete form is constructed particularly:

$$f(P_2, \ldots, P_n, q) = f_{data} + f_{smooth\_uv} + f_{smooth\_depth} \qquad (11)$$

wherein $$f_{data} = \Sigma_{x,y} \rho(\Sigma_{i=2}^n \Sigma_{I=C_1}^{C_k}((I_{x,y}^1 - I_{u^i,v^i})^2) + \beta(\nabla I_{x,y}^1 - \nabla I_{u^i,v^i})^2)) \qquad (12)$$

$$f_{smooth\_uv} = \alpha \Sigma_{x,y} \rho(\Sigma_{i=2}^n (|\nabla(u^i - x)|^2 + |\nabla(v^i - y)|^2)) \qquad (13)$$

$$f_{smooth\_depth} = \tau_1 \Sigma_{x,y} \rho(|\nabla q|^2/q^2 + \tau_2 |\Delta q|^2/q^2) \qquad (14)$$

an iterative optimization algorithm of said objective function in a discrete form (11) and a variation thereof is particularly as follows: said objective function in a discrete form (11) is essentially a non-linear least square problem, and can employ a common Levenberg-Marquardt algorithm or Guass-Newton algorithm, each iterative process comes down to solve a linear system of equations (15):

$$\delta\theta = -(H + \mu I)^{-1} b \qquad (15),$$

wherein H represents a Hessian matrix or Guass-Newton Hessian matrix, b represents a gradient vector, μ represents a non-negative number, corresponding increments $\delta P_i$ and $\delta q$ are determined according to said Levenberg-Marquardt algorithm or Guass-Newton algorithm; parameters $P_i$ and q are updated according to the increments, $P_i \leftarrow \delta P_i + P_i$, $q \leftarrow \delta q + q$ until convergence; a process of an algorithm 2 particularly comprises: inputting multiple images, initializing a camera projection matrix $P_i$ and a depth q of a three-dimensional scenario, 2≤i≤n; outputting said camera projection matrix $P_i$ (2≤i≤n), said depth q of said three-dimensional scenario and a three-dimensional representation of the scenario; iterating: calculating said Guass-Newton Hessian matrix H and said gradient vector b in said formula (15); calculating an increment δθ by said formula (15), and determining corresponding increments $\delta P_i$ and $\delta q$ respectively; updating parameters $P_i$ and q: $P_i \leftarrow \delta P_i + P_i$, $q \leftarrow \delta q + q$, 2≤i≤n; until convergence; calculating said three-dimensional representation of said scenario by said formula (1) according to the converged depth q of said three-dimensional scenario.

6. The non-feature extraction dense SFM three-dimensional reconstruction method according to claim 2, wherein a process of realizing similarity three-dimensional reconstruction or Euclidean three-dimensional reconstruction particularly comprises:

parameterization is particularly as follows: a camera projection matrix is described by camera internal parameters and camera external parameters:

P=K[R t]

wherein said camera internal parameters $\alpha_x$、 $\alpha_y$、 s、 $p_x$ and $p_y$ are included in a 3×3 matrix $$K = \begin{bmatrix} \alpha_x & s & p_x \\ 0 & \alpha_y & p_y \\ 0 & 0 & 1 \end{bmatrix},$$

said camera external parameters are determined by a 3×3 rotation matrix R and a 3×1 translation vector t, said rotation matrix R is determined by three angle parameters, namely, rotation angles $\gamma_x$、 $\gamma_y$ and $\gamma_z$ which are respectively about an x axis, a y axis and a z axis:

$$R = \begin{bmatrix} 1 & 0 & 0 \\ 0 & \cos(\gamma_x) & -\sin(\gamma_x) \\ 0 & \sin(\gamma_x) & \cos(\gamma_x) \end{bmatrix} \begin{bmatrix} \cos(\gamma_y) & 0 & \sin(\gamma_y) \\ 0 & 1 & 0 \\ -\sin(\gamma_y) & 0 & \cos(\gamma_y) \end{bmatrix} \begin{bmatrix} \cos(\gamma_z) & -\sin(\gamma_z) & 0 \\ \sin(\gamma_z) & \cos(\gamma_z) & 0 \\ 0 & 0 & 1 \end{bmatrix}$$

when said camera internal parameters and said camera external parameters are both unknown, said camera internal parameters $\alpha_x$、 $\alpha_y$、 s、 $p_x$ and $p_y$, said translation vector t, said rotation angles $\gamma_x$、 $\gamma_y$ and $\gamma_z$ and a depth q of a three-dimensional scenario are to-be-estimated undetermined parameters in realizing said similarity three-dimensional reconstruction;

when said camera internal parameters are known while said camera external parameters are unknown, said translation vector t, said rotation angles $\gamma_x$、 $\gamma_y$ and $\gamma_z$ and said depth q of said three-dimensional scenario are to-be-estimated undetermined parameters in realizing said similarity three-dimensional reconstruction;

when said camera internal parameters and said camera external parameters are both known, said depth q of said three-dimensional scenario is a to-be-estimated undetermined parameter in realizing said Euclidean three-dimensional reconstruction.

7. The non-feature extraction dense SFM three-dimensional reconstruction method according to claim 1, wherein a from coarse to fine pyramid method particularly comprises the following steps: calculating n layers of pyramid representations of an image; at the coarsest image layer, initializing n−1 camera projection matrices to $P_i=[I_3, 0]$, 2≤i≤n, initializing depths of three-dimensional scenarios of all points to 1; estimating said camera projection matrices and said depths of said three-dimensional scenarios sequentially from coarse to fine, and respectively correcting and interpolating said camera projection matrices and said depths of said three-dimensional scenarios, which serve as initial values of an iterative process of the next fine image layer; with regard to interpolation of said depths of said three-dimensional scenarios among different precision layers, it is achieved by employing a bilinear interpolation method, a bicubic interpolation method or other similar interpolation methods; with regard to correction of said camera projection matrices among different precision layer, if pixel ratios of said images with two adjacent precisions in x and y directions are $s_1$ and $s_2$, $S_1$, $S_2$<1, a camera projection matrix $P^{(k+1)}$ of a certain camera is estimated on an coarser image, wherein a superscript (k+1) represents a $(k+1)^{th}$ layer of a pyramid structure of said image, a camera projection matrix to which a $k^{th}$ layer of image corresponds is $$P^{(k)} = \begin{bmatrix} s_1 & 0 & 0 \\ 0 & s_2 & 0 \\ 0 & 0 & 1 \end{bmatrix} P^{(k+1)} \begin{bmatrix} 1/s_1 & 0 & 0 & 0 \\ 0 & 1/s_2 & 0 & 0 \\ 0 & 0 & 1 & 0 \\ 0 & 0 & 0 & 1 \end{bmatrix} \quad (16)$$

an iterative algorithm of said from coarse to fine pyramid method is particularly as follows: that is, a process of an algorithm 3 particularly comprises: inputting multiple images; outputting a camera projection matrix $P_i$ (2≤i≤n), a depth q of a three-dimensional scenario and a three-dimensional representation of said scenario; calculating m layers of pyramid representations of an image; iterating: an image layer k, from an $m^{th}$ layer to a first layer sequentially (1) if k≠m(1) on the basis of the estimated depth $q^{(k+1)}$ of a previous layer of said three-dimensional scenario, calculating a depth $q^{(k)}$ of a current layer of said three-dimensional scenario by employing an interpolation method, the depth $q^{(k)}$ serves as initialization of said depth of said three-dimensional scenario;

calculating a camera projection matrix $P_i^{(k)}$ of said current layer according to said formula (16) by using the estimated camera projection matrix $P_i^{(k+1)}$ of the previous layer of image, (2≤i≤n), said camera projection matrix $P_i^{(k)}$ serves as initialization of said camera projection matrix; Otherwise, at an $m^{th}$ layer of image initiating: a camera projection matrix of an $i^{th}$ camera is set to $P_i^{(m)}=[I_3\ 0]$, (2≤i≤n), depth information of three-dimensional scenarios of all points is set to $q^{(m)}=1$, end (2) estimating said camera projection matrix $P_i^{(k)}$), (2≤i≤n) of said current layer and a depth $q^{(k)}$ of said three-dimensional scenario by employing said algorithm 1 or algorithm 2; ending iteration outputting said camera projection matrix and said depth of said three-dimensional scenario: $P_i \leftarrow P_i^{(1)}$ (2≤i≤n), $q \leftarrow q^{(1)}$; calculating said three-dimensional representation of said scenario by said formula (1) according to said depth q of said three-dimensional scenario.

8. The non-feature extraction dense SFM three-dimensional reconstruction method according to claim 7, wherein said non-feature extraction dense SFM three-dimensional reconstruction method can be applied to a situation of a large baseline, which particularly comprises the following steps: in projective geometry, said situation of said large baseline refers to a situation that a relative motion among cameras is relatively large, resulting in significant distinction between images, in said situation of said large baseline, particularly, said SFM three-dimensional reconstruction comprises three steps:

a first step: extracting features from images and matching, wherein the extracted features include a Harris feature, a SIFT feature or a KLT feature;

a second step: based on the extracted features, estimating three-dimensional information of feature points and a camera projection matrix of cameras;

a third step: based on said first step and said second step, realizing dense SFM three-dimensional reconstruction by utilizing an algorithm 3;

wherein the estimated camera projection matrix in said second step serves as an initial value of said camera projection matrix in said third step, and the estimated depth of a three-dimensional scenario in said second step is interpolated, and the interpolated depth serves as an initial value of said depth of said three-dimensional scenario in said third step.

\* \* \* \* \*